Jan. 9, 1968   O. E. PETER ET AL   3,362,702
COMPOSITE RESILIENT ELEMENT
Filed Oct. 14, 1965

Inventors:
Oskar E. Peter & Lothar Peter

United States Patent Office 3,362,702
Patented Jan. 9, 1968

3,362,702
COMPOSITE RESILIENT ELEMENT
Oskar E. Peter, Seestr. 31, Guglingen, and Lothar Peter, both of Brackenheim, Wurttemberg, Germany; said Lothar Peter assignor to said Oskar E. Peter
Filed Oct. 14, 1965, Ser. No. 496,036
Claims priority, application Germany, Oct. 14, 1964, P 35,271
5 Claims. (Cl. 267—9)

ABSTRACT OF THE DISCLOSURE

A spring has nested outer and inner rings, the outer ring being of aluminum, preferably anodized, and presenting a matching conical surface to an inner ring made of lightweight plastic; the aluminum absorbs tensile stresses, the plastic compressive stresses.

---

Figure 1:
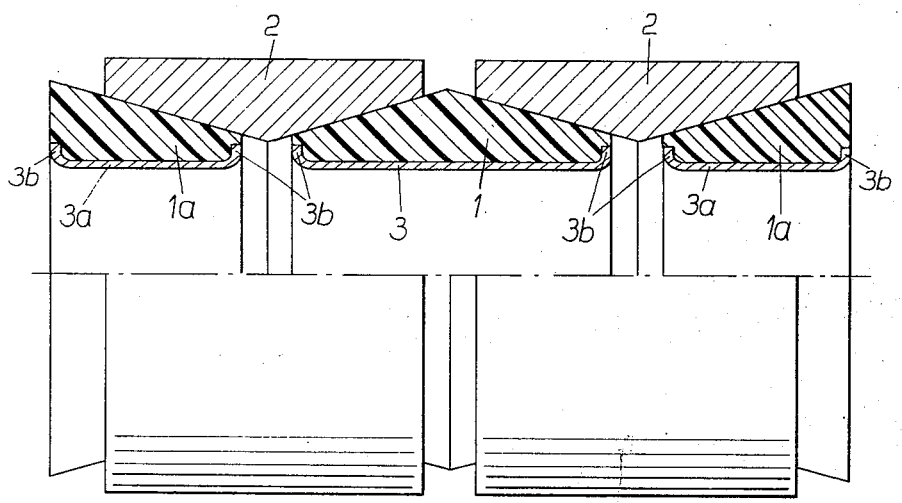

The present invention relates to an annular composite resilient element, and more particularly to an annular spring formed of nested rings having matching, conical surfaces in engagement with each other.

Compression elements consisting of composite rings having conical surfaces which are relatively movable with respect to each other are known. Upon compression, the inner rings are subject to compressive stress, and the outer rings are tensioned. This provides for absorption of substantial forces by elements which are small. Further, due to the friction at the matching surfaces, the damping of the resilient element or spring is great which prevents bounce. It has been proposed to arrange springs of this kind in which both the inner and outer rings are made of a lightweight metal, such as aluminum, which are armed at their matching surfaces with a strong, highly durable metal such as high quality steel. Due to the small modulus of elasticity of the light metal with respect to steel, such light metal compressive springs provide for good springing effect. Unfortunately, construction of such composite elements, that is lightweight rings with a steel covering, is expensive and difficult.

It is an object of the present invention to provide a composite annular resilient element which is inexpensive, easy to construct, and efficient in use.

Briefly, the present invention utilizes a light metal ring which has a conical surface; matching this conical surface is a similar conical surface of another ring made of a plastic which has a smooth surface. Preferably the lightweight ring is the outer ring, and consists of anodized aluminum; while the inner ring is of plastic. During use, a minor amount of the plastic will embed itself in the microscopic pores of the anodized conical surface of the aluminum, thus improving lubrication between the parts and preventing wear of one element against the other, as the compressive forces change.

The composite annular spring according to the present invention has the advantage that the elastic springing is improved, while at the same time permitting a decrease in cost, as well as weight of the entire assembly. The small modulus of elasticity of the plastic increases the springing action, that is, the distance of travel of the spring for a given weight, without increasing the bounce of the spring. The low specific gravity, of the plastic, as well as of the light metal, permits construction of the lightweight units. The heat generated by friction between the plastic and the lightweight is readily dissipated by the light metal rings themselves. Thus, deterioration or creep of the plastic itself is avoided. Heat of friction can be further dissipated by providing additional metal sleeves laid against the surface of the plastic, and preferably having projections embedded in the plastic. Such sleeves may be again of light metal or a copper alloy.

Figure 2:
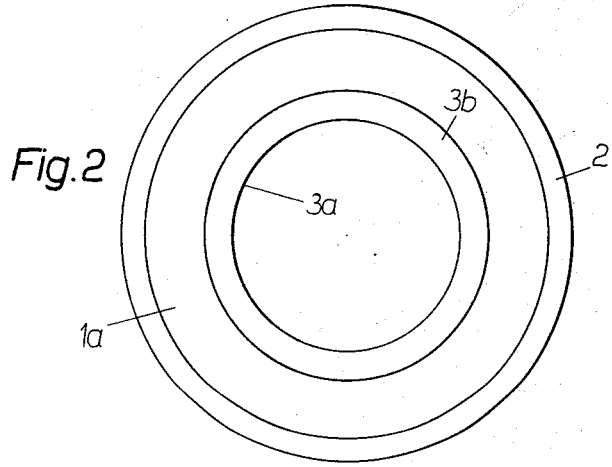

The structure, organization and operation of the invention will now be described more specifically in the following detailed description with reference to the accompanying drawings, in which:

FIG. 1 in its upper part is an axial sectional view, in its lower part is an axial view of a composite element of the invention;

FIG. 2 is a top view of an annular composite element.

The composite element consists of a continuous, that is closed inner ring 1, having outwardly facing conical surfaces, and two end rings 1a having outwardly facing conical half surfaces, that is having outwardly facing metal surfaces, as best seen in FIGURE 1. The material is a compression resistant plastic having a smooth sliding surface. Matching the conical surfaces are a pair of outer rings 2, having correspondingly inward facing conical surfaces and consisting of a light metal alloy such as aluminum, duralumin, magnesium or the like. The inner rings 1, 1a are covered at the inner surfaces by metal sleeves 3, 3a having radially projecting flanges 3b embedded or secured to the rings 1 or 1a respectively. These sleeves are of good heat conducting material such as copper, a copper alloy, or light metal similar to the metal of rings 2. Flanges 3b may be continuous, or may consist of projecting segments to hold the sleeve 3, 3a in good surface contact with rings 1, 1a.

The outer rings 2 are preferably entirely anodized, so that the microscopic pores at the surfaces of rings 2, which are in contact with rings 1, 1a will be filled in by the material of the rings 1, 1a. Thus, lubrication of the friction surfaces between 1, 1a and rings is achieved, so that the assembly does not require any further external lubrication or maintenance. Making the outer rings entirely of light metal further decreases the possibility of damage, since weakening of the outer rings by removal of metal parts due to friction with the inner rings is entirely avoided, the inner rings 1, 1a being of the inherently softer, that is plastic material. Electrolytic corrosion, due to use of the spring in moist surroundings, which may arise when dissimilar metals are in contact, is additionally prevented.

A metal suitable for inner rings 1, 1a is polytetrafluorethylene which is known under the trademark "Teflon." Another suitable material would be "nylon" or any other material of the group of polyamides; these materials have the property that, to a certain degree, they do not require lubricants when used for bearing surfaces.

We claim:
1. In an annular composite resilient element having outer ring means and inner ring means inserted therein, the inner and outer ring means being formed with relatively movable contacting matching conical surfaces; the improvement comprising forming the outer one of said ring means of light metal; and forming the inner one of said ring means of compression resistant plastic.

2. Element as claimed in claim 1, said light metal being surface anodized aluminum.

3. Composite element as claimed in claim 1 wherein said inner plastic ring means has an interior cylindrical surface; and a sleeve, formed of good heat conducted material is provided, contacting the interior cylindrical surface of said plastic ring means, said sleeve being formed with flanges molded into said plastic ring means.

4. Composite element as claimed in claim 1 wherein said outer light metal rings are aluminum having their inwardly directed conical surfaces anodized.

5. Composite element as claimed in claim 1 wherein said inner plastic ring means are of polytetrafluorethylene or of the polyamide group.

References Cited

UNITED STATES PATENTS

| 2,948,526 | 8/1960 | Maier | 267—9 |
| 3,073,585 | 1/1963 | Hanle | 267—9 |

ARTHUR L. LA POINT, *Primary Examiner.*

EUGENE G. BOTZ, *Examiner.*

R. N. WOHLFARTH, *Assistant Examiner.*